E. GLASER.
SCRAPER FOR ICE CREAM FREEZERS.
APPLICATION FILED MAY 1, 1911.
1,008,710.
Patented Nov. 14, 1911.
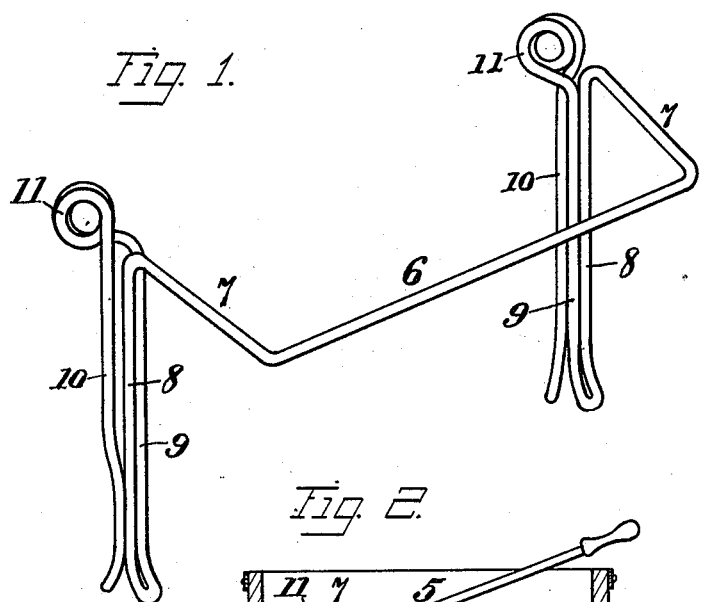
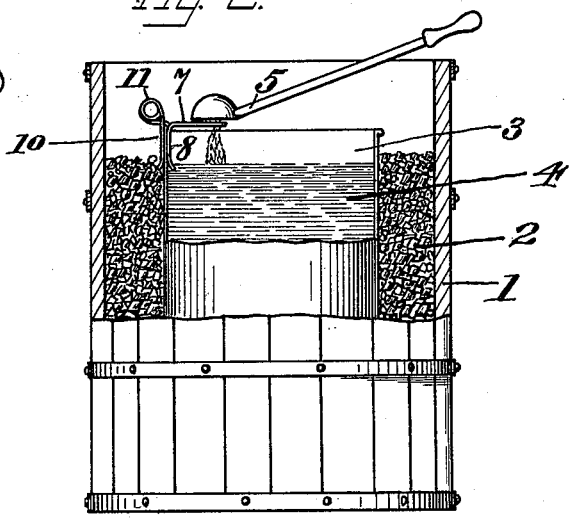
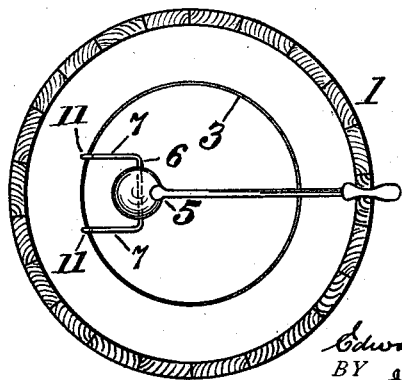
WITNESSES:
INVENTOR.
Edward Glaser,
BY John Elias Jones
ATTORNEY.

UNITED STATES PATENT OFFICE.

EDWARD GLASER, OF CINCINNATI, OHIO.

SCRAPER FOR ICE-CREAM FREEZERS.

1,008,710.  Specification of Letters Patent.  Patented Nov. 14, 1911.

Application filed May 1, 1911. Serial No. 624,319.

*To all whom it may concern:*

Be it known that I, EDWARD GLASER, a citizen of the United States of America, and a resident of Cincinnati, in the county of Hamilton and State of Ohio, have invented a certain new and useful Improvement in Scrapers for Ice-Cream Freezers, of which the following is a specification.

This invention relates to stripper or scraper devices for use in serving ice-cream or the like from the freezing-can and the object thereof is to provide a detachable device that is adapted to be applied to the rim of the can with the stripper or scraper edge thereof projecting over the interior of said can, whereby the surplus ice-cream or other material to be served falls or drops directly into the mass of material from which the portion to be served is taken in the use of the serving-implement. Such a device as is herein shown and described is cleanly and tidy and presents a scraper-edge that overhangs the mass of material within the can for the delivery of the surplus from the serving-implement directly to said mass instead of having said surplus run downward along the inner face of the can from the upper edge or rim thereof as has heretofore been the practice and results in untidiness and waste.

The invention herein consists of a horizontal scraper or stripper edge openly-supported at the inner ends of horizontal arms projecting from a pair of elastic or spring clamping-jaws, the latter being adapted to be engaged over the rim or upper edge of a can containing the ice-cream or like material to be served in individual or certain sized or measured portions, all of which will be fully hereinafter described in detail and particularly pointed out in the claim.

In the accompanying sheet of drawings, Figure 1 is a perspective view of the device embodying my invention herein, showing it entirely detached and as it appears when not in actual use; Fig. 2, a broken, sectional elevation, showing the barrel or tub of an ice-cream freezing-apparatus, showing the broken ice within the tub, an open can or freezer within said ice, a mass or supply of ice-cream partly filling said can and one of my stripper or scraper devices clamped in position for use on the upper edge or rim of said can and, also, showing one of the ordinary forms of scoops or implements used in the measured-service of said ice-cream or contents of the can; and Fig. 3, a plan view of the entire apparatus seen in Fig. 2, excepting that the removed and sectioned portions of Fig. 2 are all intact in this view.

1 indicates the tub or barrel; 2 the ordinary supply of broken ice or freezing medium; 3 the ordinary metal can or freezer placed upright within said ice-supply and 4 the mass of ice-cream or frozen material within said can.

In using my scraper device herein, the lid of the can is removed, as customary, and the measured-service of the ice-cream or frozen material is conducted by means of a suitable scoop or serving-implement such as is shown at 5. This serving-implement is of the ordinary kind that contains a scooping-mold and, if desired, a hand-operated device within its structure for releasing the ice-cream held within the scoop or mold. This scoop is not claimed as any part of the invention herein but it is important to refer to it for the reason that in its use it is desirable and advantageous to provide a scraper or stripper for removing the surplus ice-cream from such scoop before the operator actuates the ice-cream releasing device over the receiving dish or plate.

My stripper or scraper device herein is composed of a horizontal bar 6 supported by means of arms 7, 7, and the latter, in turn, projecting forwardly from the upper ends of vertical members or bars 8, 8. Members or bars 8, 8 extend integrally at their lower ends from upright members or bars 9, 9 that lie approximately parallel thereto and said bars or members 9, 9 extend from additional vertical bars or members 10, 10 with an intervening integral coil or spiral 11 between adjacent bars or members 9 and 10. The lower ends of the vertical bars 8, 9 and 10 flare outwardly, as shown in Figs. 1 and 2, so that the clamping-jaws can be readily put in operating-position on the rim of the freezing-can 3. This stripper or scraper device, taken as a whole or unit, is made preferably of a single strip of wire that is bent progressively into the several bars or members, coils or spirals, arms and the scraper-proper, in the relation of parts immediately above described. The bars 9 and 10 are arranged in adjacent pairs and the coils or spirals 11 that unite them in such pairs at their respective upper ends form resilient or elastic clamping-jaws that are adapted to be readily used in detachably-securing the scraper device herein to the upper edge or rim of the freezing can or vessel 3.

In attaching my device in place on the rim of the freezer or can 3, it is arranged so that the horizontal arms 7, 7 project inwardly toward the middle of the can, whereby the actual stripper or scraper edge 6 shall lie vertically above the mass or supply of ice-cream or frozen material within the can. Thus the operator can use his scoop or serving device to readily remove the surplus ice-cream or frozen material directly over the said mass of material within the can so that such surplus will not run down the inner face of the can to become untidy, unsightly, or go to waste and without the necessity of scraping such material from the inner face of the can that has been a decided fault in stripping or scraping the surplus along the edge or rim of the can. The stripper or scraper bar 6 being arranged over the mass of material within the can, the surplus drops back directly into said mass, where it can be duly repacked if desired, either with the serving-scoop or otherwise, and there is no chance for the said surplus to run over either the inner edge or the outer edge of the can to become wasted or unsightly, or for such surplus to drop into the mass of broken ice or freezing medium surrounding the can, such as has frequently occurred in stripping the surplus along the edge of the can.

I claim:—

A detachable ice-cream scraper comprising a single strip of wire bent progressively into a main horizontal stripper-bar or scraper-edge proper, parallel arms at the opposite ends of the stripper-bar, pendent members or bars at the inner ends of said parallel arms, parallel upright members or bars each lying closely adjacent to the said pendent members or bars, coils in the wire at the upper ends of said parallel upright bars and pendent parallel members or bars terminating said coils and forming resilient jaw-members in connection with the closely adjacent first-named pendent members and the next-named upright members whereby the device is adapted to be engaged over the upper edge or rim of a freezing can or receptacle for presenting the said scraper-edge over the contents of the receptacle.

EDWARD GLASER.

Witnesses:
JOHN ELIAS JONES,
LAURA E. SHIELDS.

---

Copies of this patent may be obtained for five cents each, by addressing the "Commissioner of Patents, Washington, D. C."